US006625871B1

(12) United States Patent
Schmidt et al.

(10) Patent No.: US 6,625,871 B1
(45) Date of Patent: Sep. 30, 2003

(54) METHOD OF ATTACHING MAGNETIC RECORDING HEADS TO ACTUATOR ARMS USING THERMOPLASTIC BONDING

(75) Inventors: Ryan Schmidt, Santa Barbara, CA (US); Kevin Hanrahan, Santa Barbara, CA (US)

(73) Assignee: Intriplex Technologies, Inc., Santa Barbara, CA (US)

( * ) Notice: Subject to any disclaimer, the term of this patent is extended or adjusted under 35 U.S.C. 154(b) by 308 days.

(21) Appl. No.: 09/679,137

(22) Filed: Oct. 3, 2000

Related U.S. Application Data

(63) Continuation of application No. 09/030,597, filed on Feb. 25, 1998, now abandoned.

(51) Int. Cl.$^7$ ............................ G11B 5/48; B29C 65/18; H04R 31/00
(52) U.S. Cl. ................ 29/603.06; 29/603.4; 29/603.03; 264/248; 264/249; 264/273; 360/244.5; 360/244.6; 360/244.7; 156/73.1
(58) Field of Search .................... 29/603.04, 603.06, 29/603.03, 603.05, 525.06, 525.07, 521; 360/244.5, 244.7, 244.6; 264/248, 249, 273; 156/73.1, 73.5, 309.6

(56) References Cited

U.S. PATENT DOCUMENTS

| 3,890,679 | A | * | 6/1975 | Simon ..................... 264/273 X |
| 4,925,507 | A | * | 5/1990 | Yamaguchi ................ 156/73.1 |
| 4,991,045 | A | * | 2/1991 | Oberg ..................... 360/244.3 |
| 5,715,117 | A | * | 2/1998 | Brooks .................... 360/244.5 |

FOREIGN PATENT DOCUMENTS

JP      7-272426     * 10/1995

* cited by examiner

*Primary Examiner*—A. Dexter Tugbang
(74) *Attorney, Agent, or Firm*—Owen L. Lamb

(57) ABSTRACT

A method of attaching a load beam to a head actuator arm. A number of weld holes are provided in the load beam and the actuator arm. A thermoplastic base plate is aligned over the weld holes in the load beam and the actuator arm. A heating tool having a number of pins is clamped over the base plate such that points of the heating tool pins coincide with the number of weld holes. The heating tool is heated such that peaks of thermoplastic base plate material are extruded through the weld holes. The heating tool causes heat to be applied and focused at the points to cause the thermoplastic base plate to flow and expand into the weld holes in both the load beam and the actuator arm, thereby rigidly connecting the thermoplastic base plate and load beam to the actuator arm.

12 Claims, 3 Drawing Sheets

METHOD OF ATTACHING MAGNETIC RECORDING HEADS TO ACTUATOR ARMS USING THERMOPLASTIC BONDING

This is a continuation of application Ser. No. 09/030,597, filed Feb. 25, 1998, now abandoned.

BACKGROUND OF THE INVENTION

1. Field of the Invention

This invention relates to disk head assemblies for supporting read/write heads adjacent rotating disks in disk drives and more particularly, to a method and means of attaching a head suspension assembly to a head actuator arm using thermoplastic bonding with a thermoplastic suspension base plate or a thermoplastic actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment With concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram load". Air turbulence caused by the rotating disks lifts the heads slightly off of the disks so that the heads fly on an air bearing across the disk surfaces. The air bearing force is counteracted by the suspension gram load. A spring section of the load beam is formed to provide the load force that counteracts the aerodynamic lift force generated by the rotating disk during operation of the disk drive.

A head-carrying suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. The combined base plate, load beam and a flexure make up a head suspension, and the suspension typically has the hub of the base plate extending through and beyond the load beam clearance hole or alternatively the hub and load beam clearance hole are aligned and the flange is welded on the opposite side.

The hubs of the suspensions are inserted into an actuator arm boss hole formed through an actuator arm extending from an actuator body, one hub entering an actuator arm boss hole from each end of the hole in a mid arm between the end-most arms. A swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

A typical base plate has two primary regions, a flange region and a hub region. The flange region is a flat portion to which the load beam is welded. This area preferably remains flat and free from distortion so that it serves as a stable mounting feature for the load beam and ideally remains so throughout the swaging operation.

The hub region is an extended boss whose upper end is contiguous with the flange portion and whose lower end passes through boss clearance holes in both the load beam and the actuator arm. The hub region supplies the retention torque between the base plate, which is welded to the load beam, and the actuator arm by plastically expanding and cold working during the swaging operation, creating a press fit with the actuator arm. A problem with this process is that the base plate flange becomes warped by stress from the hub during the swaging operation. Consequently, the load beam, which is welded to the base plate flange, is deformed by the warping of the base plate flange, adversely affecting the gram load on the transducer head. After assembly, the gram load is tested and if not correct the spring section of the load beam is bent appropriately to adjust the gram load to a predetermined standard. This operation may further distort the load beam and adversely affect the dynamic performance thereof Since the two transducer suspensions are joined to an actuator arm by passing a ball through two hubs in the same hole in the actuator arm, an asymmetry exists in the forces that are exerted on the hubs to make the joints. The transducers face in opposite directions and the hubs on their respective load beams also extend in opposite directions with respect to the direction of passage of the ball through the inner diameters of the hubs. For one transducer suspension, the ball is passed in a direction that tends to place the hub in compressive stress. For the other transducer suspension, the direction of passage of the ball is so as to tend to place the hub in tensile stress. This difference in stresses causes a variance in gram load change and joint integrity between the two swage directions.

It is therefore an object of this invention is to provide a method and means of attaching magnetic recording heads to actuator arms that reduces the large differing stresses and deformations associated with swaging that result in gram load change, joint integrity and gram load change differences between tension and compression swage directions.

SUMMARY OF THE INVENTION

A method of bonding a base plate of a head suspension to an actuator arm in which at least one portion of the base plate or the actuator arm is fabricated of thermoplastic. The suspension and actuator arm are clamped together to form a head stack assembly and the thermoplastic is heated with a heating tool that causes the thermoplastic to deform and bond together the base plate and the actuator arm.

This invention encompasses four unique thermoplastic attachment methods:

1) Bonding metal base plates to an actuator arm by passing a thermoplastic cylinder through the inside diameters of the base plate hubs, clamping the suspension/actuator arm assembly together, and heating and expanding the thermoplastic cylinder ultrasonically causing it to deform and bond to the base plate flanges, the hub inside diameter, and the actuator arm boss hole.

2) Expanding and bonding a thermoplastic base plate hub to an actuator arm boss hole by heating the boss portion of the base plate with a slightly oversized ultrasonic horn pin driven through the base plate inside diameter, resulting in a bond between the base plate boss outside diameter and the hole in the actuator arm.

3) Heating and extruding small peaks of thermoplastic base plate flange material, with a pinned ultrasonic horn, through holes in the load beam and into holes in the actuator arm to attach the load beam and base plate to the actuator arm.

4) Heating and folding over a portion of a thermoplastic actuator arm onto the suspension assembly to constrain and bond the suspension to the actuator arm, using an ultrasonic horn with tapered prongs.

The invention has the advantage that it reduces the large stresses and deformations associated with swaging that result in gram load change, joint integrity and gram load differences between up and down facing head.

The invention has the advantage that thermoplastic base plates and thermoplastic actuator arms greatly reduce disk damage in the drive that results from contact between the base plate or actuator arm and disk during a shock event incurred by the drive.

BRIEF DESCRIPTION OF THE DRAWINGS

The invention will be described in greater detail with reference to the drawings in which:

FIG. 1b is side elevation view along view line 1b—1b of the base plate of FIG. 1a;

FIG. 3b is a top view of the thermoplastic base plate of FIG. 3a;

FIG. 4b is a side elevation view of the thermoplastic arm of FIG. 4a; and,

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1A:
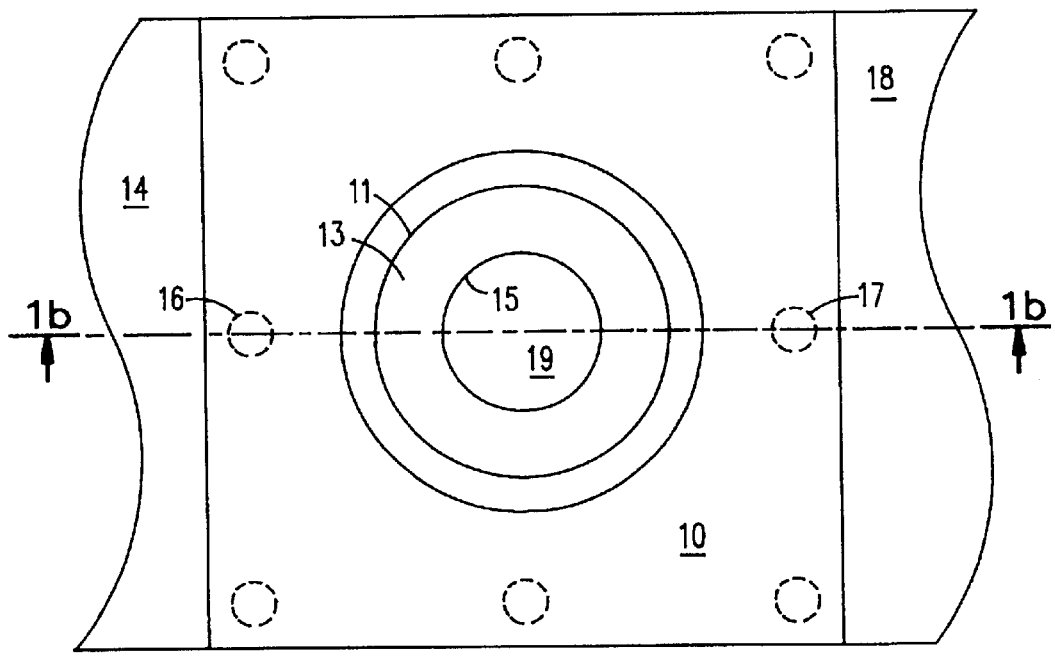
FIG. 1a is a top view of a base plate of the prior art.
Figure 1B:
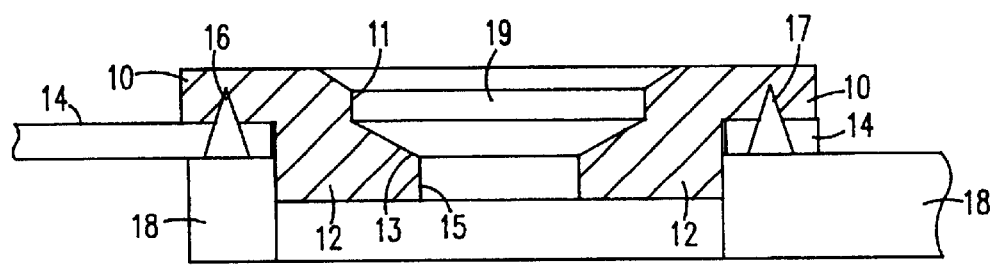

Refer to FIGS. 1a and 1b which illustrate a base plate of the prior art. An actuator arm and transducer suspension assembly, which are elements of a head stack assembly (HSA), are connected end to end by the base plate which is part of the transducer suspension assembly. The base plate includes a flat flange portion 10 and a cylindrical hub portion or boss 12. A base plate typically has an inner barrel shape with a counter bore 11, a lead-in chamfer 13 and an inner diameter 15. The counter bore and inner diameter are perpendicular to the plane of the base plate flange 10. The hub 12 is inserted through a load beam boss hole in a load beam 14 and the flange portion 10 is welded 16, 17, etc. to the load beam. Alternatively, the hub and load beam clearance hole are aligned and the flange is welded on the opposite side. The hub is then inserted through an actuator arm boss hole in the actuator arm 18. A swage ball is passed through the center inner barrel 19 of the hub 12 causing pressure to be applied which causes the hub 12 to expand into the boss hole in the actuator arm, rigidly connecting the hub and attached load beam to the actuator arm boss hole.

Thermoplastic Cylinder

Figure 2:
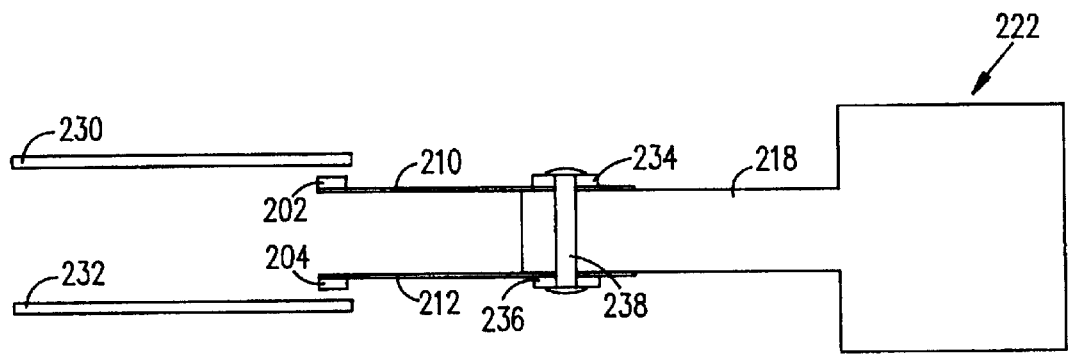
FIG. 2 is side elevation view of a head actuator assembly which illustrates a first and a second embodiment of the present invention.

FIG. 2 is an illustration of a first embodiment of the present invention for connecting a stack of head suspension assemblies to actuator arms. Transducer heads 202, 204, are attached to gimbals at the ends of suspensions forming the Head suspension assemblies. Two head-suspension assemblies are connected to a middle actuator arm 218 that extends from the actuator body 222. Each head suspension assembly includes a flexible load beam 210, 212, constructed of light sheet steel that, will flex sufficiently to permit air turbulence caused by the rotating disks 230, 232, to lift the heads slightly off of the disks so that the heads fly across the disk surfaces on an air bearing.

Two suspensions are attached to one actuator arm using base plates that form a part of each respective suspension. One suspension is attached to the actuator arm 218 using a base plate 234. Another suspension is attached to the actuator arm 218 using a base plate 236. Each base plate may include a flat flange and a locator hub. The hub is a cylinder with a hole or barrel that passes through the hub and flange. Each base plate flange is spot welded to each respective load beam. The combined base plate/load beam and attached gimbal or flexure carrying a read/write head is called a head suspension assembly.

In FIG. 2, the actuator arm 218 carries two Head suspension assemblies 210, 212, on opposite sides thereof. The Head suspension assemblies support two transducer heads 202, 204, in opposing directions in close proximity with the surfaces of the two disks 230, 232, in the assembled hard disk drive. The metal base plate are bonded to an actuator arm by passing a thermoplastic cylinder 238 through the inside diameters of the base plate hubs, clamping the suspension/actuator arm assembly together, and heating and expanding the thermoplastic cylinder ultrasonically causing it to deform and bond to the base plate flanges, the hub inside diameter, and the actuator arm boss hole 240. An ultrasonic horn is passed through a barrel of the cylindrical core 238 to heat the plastic. The plastic expands and grips the boss holes of the load beam and actuator arm.

Thermoplastic Base Plate Hub

In accordance with a second embodiment of the invention, the base plates 234, 236, may be made of thermoplastic, with a flange portion and a cylindrical hub. The thermoplastic base plate hub is inserted into a boss hole in the load beam. The thermoplastic base plate flange is affixed to the load beam by heating with an ultrasonic horn, for example by the method described below with reference to FIGS. 3a through 3b. The cylindrical hub is inserted into the actuator arm boss hole 240 formed through the actuator arm 218. An ultrasonic horn is passed through the barrel of the cylindrical hub of the base plate to heat the plastic. The plastic hub expands, grips and bonds to the boss holes of the actuator arm.

Thermoplastic Base Plate Flange

Figure 3A:
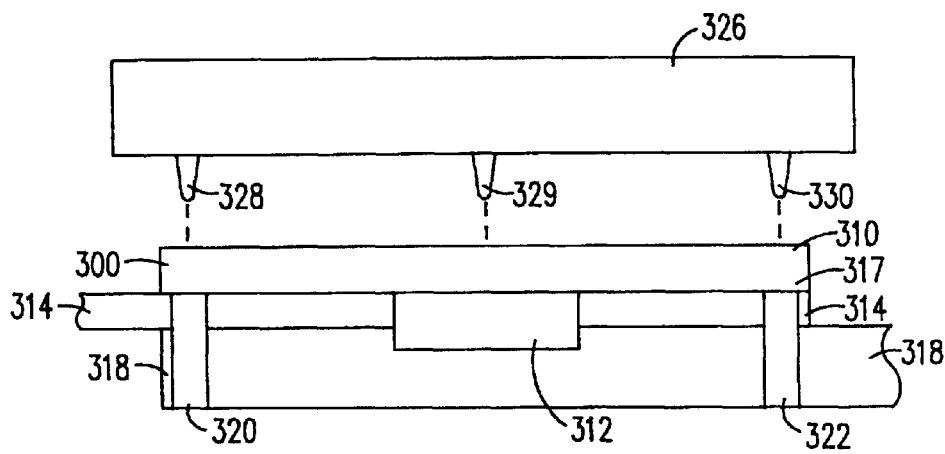
FIG. 3a is a side elevation view of a thermoplastic base plate which illustrates a third embodiment of the invention.
Figure 3B:
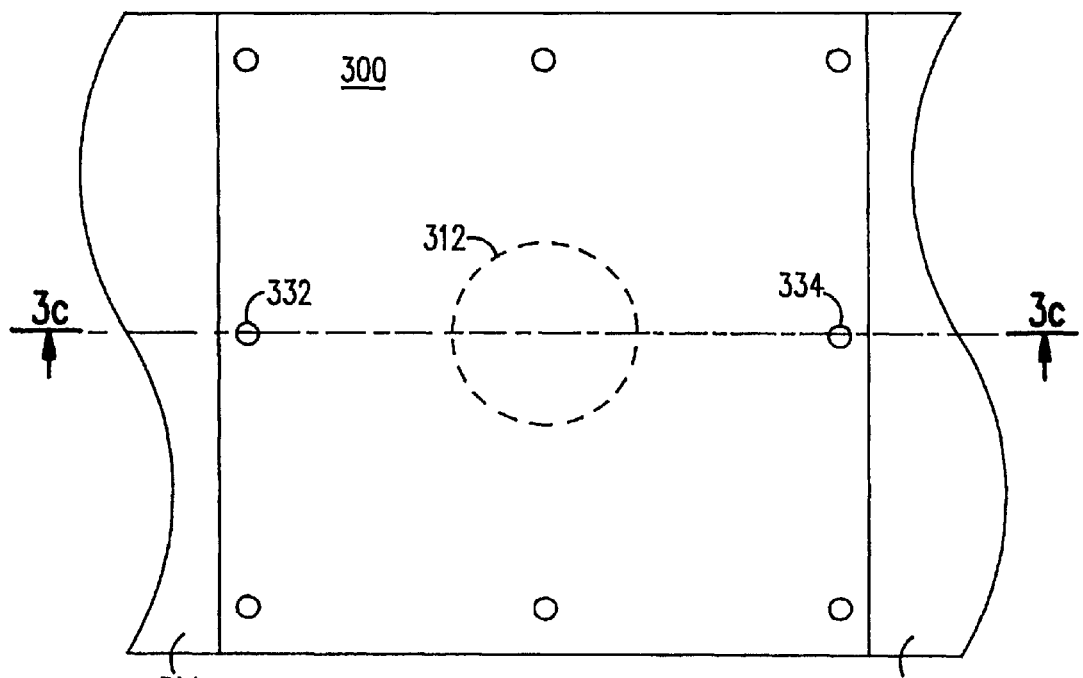
Figure 3C:
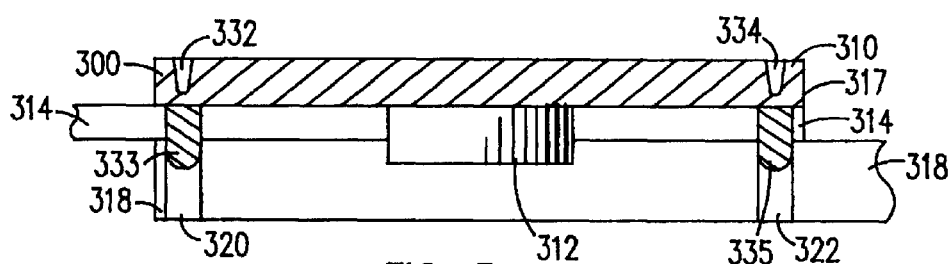
FIG. 3c is a side elevation view of the thermoplastic base plate of FIG. 3a after heating by an ultrasonic horn.

Refer to FIG. 3a and FIG. 3c which are side elevation views of the thermoplastic base plate of FIG. 3b. An actuator arm 318 and load beam 314, which are elements of an head stack assembly (HSA), are connected end-to-end by a thermoplastic base plate. The thermoplastic base plate includes a flat flange portion. 300 and a cylindrical locator hub 312 used for locating the base plate in holes in both load beam 314 and arm 318. In assembling the actuator arm, the locator hub 312 is inserted through a load beam boss hole in load beam 314 and an arm boss hole in the arm 318. A clamping ultrasonic horn 326 causes heat to be applied and focused at w points 328, 329, 330, etc. to cause the flange 300 to flow and expand into the weld holes 320, 322, etc. in both the load beam and the arm 318 located around the periphery of the actuator arm, rigidly connecting the base plate and load beam to the actuator arm.

Alternatively, the locator hub 312 may be replaced with a clearance hole for alignment with the holes in both load beam 314 and arm 318. In assembling the actuator arm, a locator tool is inserted through the hole in the thermoplastic flange, the load beam boss hole in load beam 314, and the arm boss hole in the arm 318. A clamping ultrasonic horn 326 causes heat to be applied and focused at points 328, 329, 330, etc. to cause the flange 300 to flow and expand into the weld holes 320, 322, etc. in both the load beam and the arm 318 located around the periphery of the actuator arm, rigidly connecting the base plate and load beam to the actuator arm. The advantage of a clearance hole over a locator hub is reduced stack height of the finished head stack assembly.

FIG. 3c shows the part after ultrasonic bonding. Extruded plastic 333, 335, extends into the holes 320, 322, as a result of the prongs 328, 330 of the ultrasonic horn 326. There is one prong for each weld joint. The prongs leave indentations 332, 334, etc. in the thermoplastic.

Thermoplastic Actuator Arm

Figure 4A:
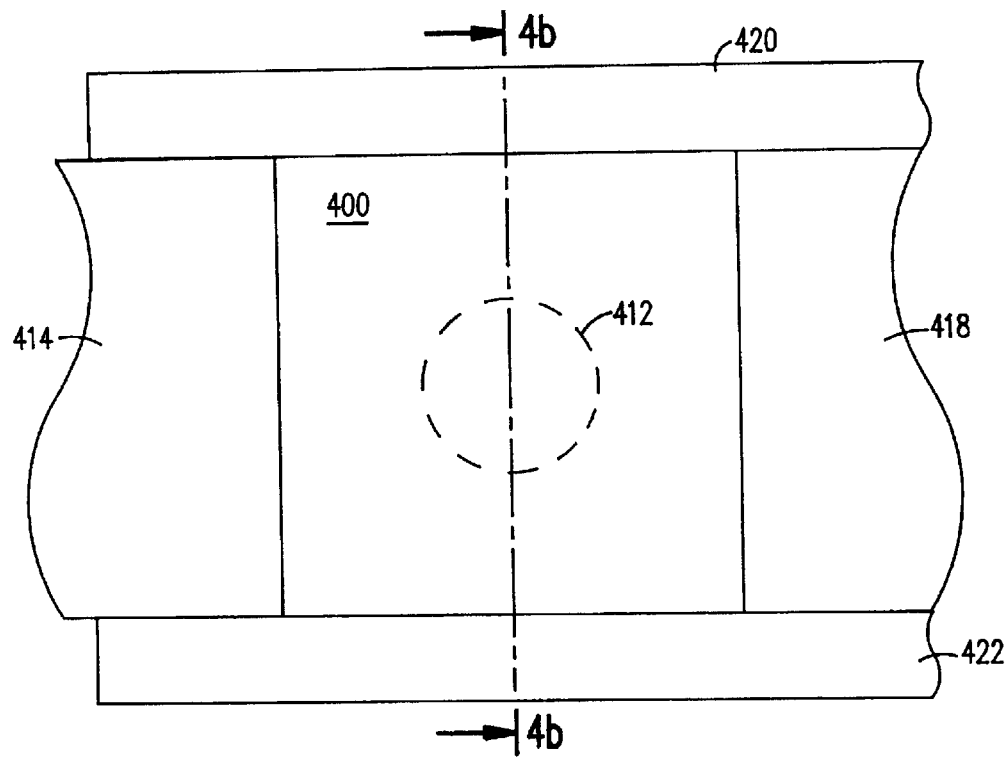
FIG. 4a is a top view which illustrates a thermoplastic arm of a fourth embodiment of the invention.
Figure 4B:
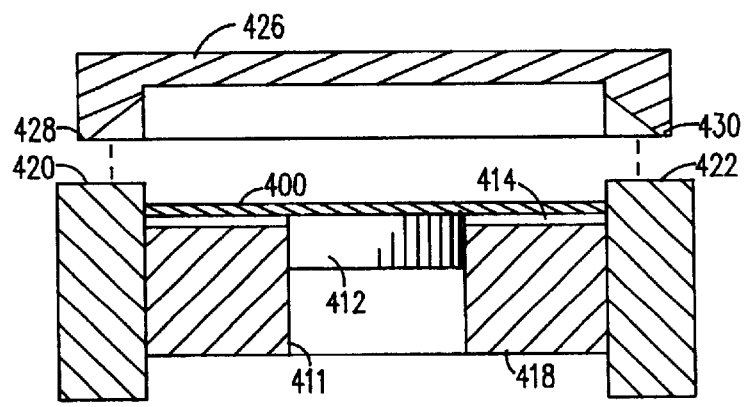

Refer to FIG. 4a and FIG. 4b which illustrate a fourth embodiment of the invention. An actuator arm 418 and load beam 414, which are elements of an head stack assembly (HSA), are connected end-to-end by a base plate. The base plate includes a flat flange portion 400 and a cylindrical locator hub 412 used for locating the suspension in hole 411 in arm 418. In assembling the HSA arm, the locator hub 412 is inserted into an arm boss hole in the arm 418. The actuator arm 418 has rail portions 420, 422 that provide a channel in which the load beam 414 and base plate flange 400 fit. The rail portions 420, 422 are ultrasonically welded using a clamping ultrasonic horn 426 which causes melted plastic to flow over flange 400. The clamping ultrasonic horn 426 causes heat to be applied and focused at prongs 428, 430, to cause the rails 428, 430, to flow and expand onto the flange 400, rigidly connecting the base plate 400 and load beam 414 to the actuator arm.

Figure 4C:
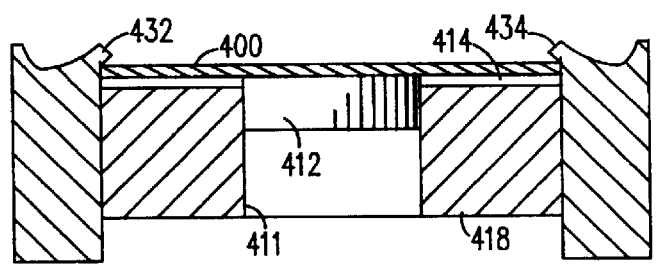
FIG. 4c is a side elevation view of the thermoplastic arm of FIG. 4a after heating by an ultrasonic horn.

FIG. 4c shows the assembly after ultrasonic bonding. Extruded plastic 432, 434, extends onto the flange 400, as a result of the prongs 428, 430 of the ultrasonic horn 426. The prongs preferably extend the length of the flange 400.

Alternatively, the locator hub 412 may be replaced with a clearance hole for alignment with the holes in both load beam 414 and arm 418. In assembling the actuator arm, a locator tool is inserted through the load beam boss hole in load beam 414 and the arm boss hole in the arm 418. The clamping ultrasonic horn 426 causes heat to be applied as described above. The advantage of a clearance hole over a locator hub is reduced stack height of the finished head stack assembly.

While the invention has been particularly shown and described with reference to preferred embodiments thereof, it will be understood by those skilled in the art that the foregoing and other changes in form and detail may be made therein without departing from the scope of the invention.

What is claimed is:

1. A method of attaching a load beam to a head actuator arm comprising steps of:
   A. providing a number of weld holes in said load beam and said actuator arm;
   B. aligning a thermoplastic base plate over said weld holes in said load beam and said actuator arm;
   C. clamping a heating tool over said base plate such that points of said heating tool coincide with said number of weld holes; and,
   D. heating said heating tool such that peaks of thermoplastic base plate material are extruded through said weld holes.

2. The method of claim 1 wherein said heating tool is an ultrasonic horn.

3. A method of attaching a load beam having a load beam boss hole in said load beam to a head actuator arm having an arm boss hole in said actuator arm comprising steps of:
   A. providing a number of weld holes in said load beam and said actuator arm;
   B. aligning a thermoplastic base plate that includes a flat flange portion and a cylindrical locator hub over said weld holes in said load beam and said actuator arm such that said locator hub is inserted through said load beam boss hole in said load beam and said arm boss hole in said actuator arm;
   C. clamping a heating tool over said base plate such that points of said heating tool coincide with said number of weld holes; and,
   D. heating said heating tool such that peaks of thermoplastic base plate material are extruded through said weld holes.

4. The method of claim 3 wherein said heating tool is an ultrasonic horn.

5. A method of attaching a load beam having a load beam boss hole in said load beam to a head actuator arm having an arm boss hole in said actuator arm comprising steps of:
   A. providing a number of weld holes in said load beam and said actuator arm;
   B. aligning a thermoplastic base plate that includes a clearance hole in said thermoplastic base plate over said weld holes in said load beam and said actuator arm such that said clearance hole in said thermoplastic base plate, said load beam boss hole in said load beam, and said arm boss hole in said actuator arm are aligned:
   C. inserting a locator tool through said clearance hole, said load beam boss hole in said load beam, and said arm boss hole in said actuator arm;
   D. clamping a heating tool over said base plate such that points of said heating tool coincide with said number of weld holes; and,
   E. heating said heating tool such that peaks of thermoplastic base plate material are extruded through said weld holes.

6. The method of claim 5 wherein said heating tool is an ultrasonic horn.

7. A method of attaching a load beam assembly to a head actuator arm comprising steps of:
   A. providing weld holes in said load beam and said actuator arm;
   B. aligning a thermoplastic base plate flange over said weld holes in said load beam and actuator arm;
   C. clamping a heating tool over said thermoplastic base plate flange; and,
   D. extruding peaks of thermoplastic base plate flange material through said weld holes in said load beam and into said weld holes in said actuator arm, by heating said heating tool.

8. The method of claim 7 wherein said heating tool is an ultrasonic horn.

9. A method of attaching a load beam having a load beam boss hole in said load beam to a head actuator arm having an arm boss hole in said actuator arm comprising steps of:
   A. providing weld holes in said load beam and said actuator arm;

B. aligning a thermoplastic base plate that includes a flat flange portion and a cylindrical locator hub over said weld holes in said load beam and said actuator arm such that said locator hub is inserted through said load beam boss hole in said load beam and said arm boss hole in said actuator arm;

C. clamping a heating tool over said thermoplastic base plate flange; and,

D. extruding peaks of thermoplastic base plate flange material, through said weld holes in the load beam and into said weld holes in said actuator arm, by heating said heating tool.

10. The method of claim 9 wherein said heating tool is an ultrasonic horn.

11. A method of attaching a load beam assembly having a load beam boss hole in said load beam to a head actuator arm having an arm boss hole in said actuator arm comprising steps of:

A. providing weld holes in said load beam and said actuator arm;

B. aligning a thermoplastic base plate that includes a clearance hole in said thermoplastic base plate over said weld holes in said load beam and said actuator arm such that said clearance hole in said thermoplastic base plate, said load beam boss hole in said load beam and said arm boss hole in said actuator arm are aligned;

C. inserting a locator tool through said clearance hole said load beam boss hole in said load beam and said arm boss hole in said actuator arm;

D. clamping a heating tool over said thermoplastic base plate flange; and,

E. extruding peaks of thermoplastic base plate flange material through said weld holes in said load beam and into said weld holes in said actuator arm, by heating said heating tool.

12. The method of claim 11 wherein said heating tool is an ultrasonic horn.

* * * * *